United States Patent
Park

(10) Patent No.: US 9,128,890 B2
(45) Date of Patent: Sep. 8, 2015

(54) SEMICONDUCTOR MEMORY SYSTEM AND METHOD FOR CONTROLLING ORDER OF ACCESS OPERATION ON A PLURALITY OF MEMORY DEVICES OF MULTI-PLANE ARRAY

(71) Applicant: SK hynix Inc., Gyeonggi-do (KR)

(72) Inventor: Jong-Ju Park, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 50 days.

(21) Appl. No.: 13/955,954

(22) Filed: Jul. 31, 2013

(65) Prior Publication Data

US 2014/0181424 A1 Jun. 26, 2014

(30) Foreign Application Priority Data

Dec. 20, 2012 (KR) .................. 10-2012-0149781

(51) Int. Cl.
*G06F 13/00* (2006.01)
*G06F 13/16* (2006.01)

(52) U.S. Cl.
CPC ................... *G06F 13/1663* (2013.01)

(58) Field of Classification Search
CPC ..................................... G06F 13/1663
USPC ................................... 710/62–64
See application file for complete search history.

(56) References Cited

U.S. PATENT DOCUMENTS 8,434,016 B2 * 4/2013 Butlin et al. ............... 715/765
2010/0049908 A1 2/2010 Gonzalez et al.

FOREIGN PATENT DOCUMENTS

KR 1020110014919 2/2011

* cited by examiner

*Primary Examiner* — Tammara Peyton
(74) *Attorney, Agent, or Firm* — IP & T Group LLP

(57) ABSTRACT

A semiconductor memory system may include a plurality of memory devices each configured to have multiple planes, and an access controller configured to access each of the multiple planes corresponding to each of the plurality of memory devices as a unit memory.

20 Claims, 4 Drawing Sheets

SEMICONDUCTOR MEMORY SYSTEM AND METHOD FOR CONTROLLING ORDER OF ACCESS OPERATION ON A PLURALITY OF MEMORY DEVICES OF MULTI-PLANE ARRAY

CROSS-REFERENCE TO RELATED APPLICATION

The present application claims priority of Korean Patent Application No. 10-2012-0149781, filed on Dec. 20, 2012, which is incorporated herein by reference in its entirety.

BACKGROUND

1. Field

Exemplary embodiments of the present invention relate to semiconductor design technology, and more particularly, to a semiconductor memory system and an operating method thereof including a plurality of memory devices of multi-plane array.

2. Description of the Related Art

In general, semiconductor memory devices are classified into volatile memory devices, such as a dynamic random access memory (DRAM) and a static random access memory (SRAM), and nonvolatile memory devices, such as a programmable read only memory (PROM), an erasable PROM (EPROM), an electrically EPROM (EEPROM), and a flash memory device. The distinguishable characteristic between the volatile memory device and the nonvolatile memory device from each other is whether or not data stored in a memory cell is retained.

Whether data is retained or not may be dependent on a memory cell structure. That is, a volatile memory device and a nonvolatile memory device have different memory cell structures. From a viewpoint of the memory cell structure, data stored in a volatile memory device is not retained after a certain time, whereas data stored in a nonvolatile memory device is retained even after a certain time. Accordingly, in the case of a volatile memory device, a refresh operation must be performed in order to retain data. In contrast, in the case of a nonvolatile memory device, a refresh operation is not essential, which is suitable for a recent tendency toward lower power and high degree of integration and makes nonvolatile memory devices widely used as storage media for portable devices.

Recently, package technology for semiconductor memory devices is developing in order to meet user's needs. A multi-chip packaging is recently being proposed as package technology for semiconductor memory devices. The multi-chip packaging refers to the formation of a plurality of semiconductor devices into a single chip, wherein homogeneous semiconductor devices are stacked to increase the memory capacity or heterogeneous semiconductor devices of different functions are stacked to improve desired performance.

A semiconductor memory system capable of controlling semiconductor memory devices more efficiently is proposed below.

SUMMARY

Exemplary embodiments of the present invention are directed to provide an operating method of a semiconductor memory system that is capable of controlling order of access operations on a plurality of memory devices of multi-plane array.

In accordance with an embodiment of the present invention, a semiconductor memory system may include a plurality of memory devices each configured to have multiple planes, and an access controller configured to access each of the multiple planes corresponding to each of the plurality of memory devices as a unit memory.

The semiconductor memory system may further include a host controller configured to control a read operation and a write operation on the plurality of memory devices, a read buffer configured to receive data from the plurality of memory devices when performing the read operation, and a write buffer configured to receive external data when performing the write operation.

In accordance with another embodiment of the present invention, an operating method of a semiconductor memory system may include performing a first access operation on one or more of multiple planes included in a first memory device, and performing a second access operation on one or more of multiple planes included in a second memory device after the first access operation.

The operating method may further include performing a third access operation on planes other than the planes on which the first access operation has been performed among the multiple planes of the first memory device after the second access operation.

In accordance with yet another embodiment of the present invention, an operating method of a semiconductor memory system may include selecting one of multiple planes included in a plurality of memory devices arranged by a plurality of channels and a plurality of ways, and performing an access operation on the selected plane, wherein the selecting of the one plane is determined according to priority of the plurality of channels, the multiple planes, and the plurality of ways.

Each of the plurality of channels may include a common transmission line.

In accordance with still another embodiment of the present invention, an operating method of a semiconductor memory system may include determining the size of data received from a host, selecting one of multiple planes included in a plurality of memory devices arranged by a plurality of channels and a plurality of ways, transferring the data through an access operation on the selected plane, and performing a write operation on the data. The selecting of the one plane is determined according to priority of the plurality of channels, the multiple planes, and the plurality of ways.

A write type of the plurality of memory devices may be determined according to data transferred to the last plane of multiple planes included in a corresponding memory device.

In accordance with still another embodiment of the present invention, a semiconductor memory system, may include a plurality of memory devices each configured to have at least two planes, wherein the plane is a unit of access to the plurality of memory devices, and each of the planes in the plurality of memory devices has an access priority, and an access controller configured to access the planes with the access priority.

In accordance with still another embodiment of the present invention, an operating method of a plurality of memory devices may include accessing a plurality planes in the plurality of memory devices with an access priority, wherein each of the plurality of memory devices has at least two planes, the plane is a unit of access to the plurality of memory devices, and each of the planes has the access priority.

In the operating method of the semiconductor memory system in accordance with an embodiment of the present invention, from a viewpoint of a plurality of memory devices, a rapid access operation may be achieved because order of access operations on a plurality of memory devices is controlled.

DETAILED DESCRIPTION

Figure 1:
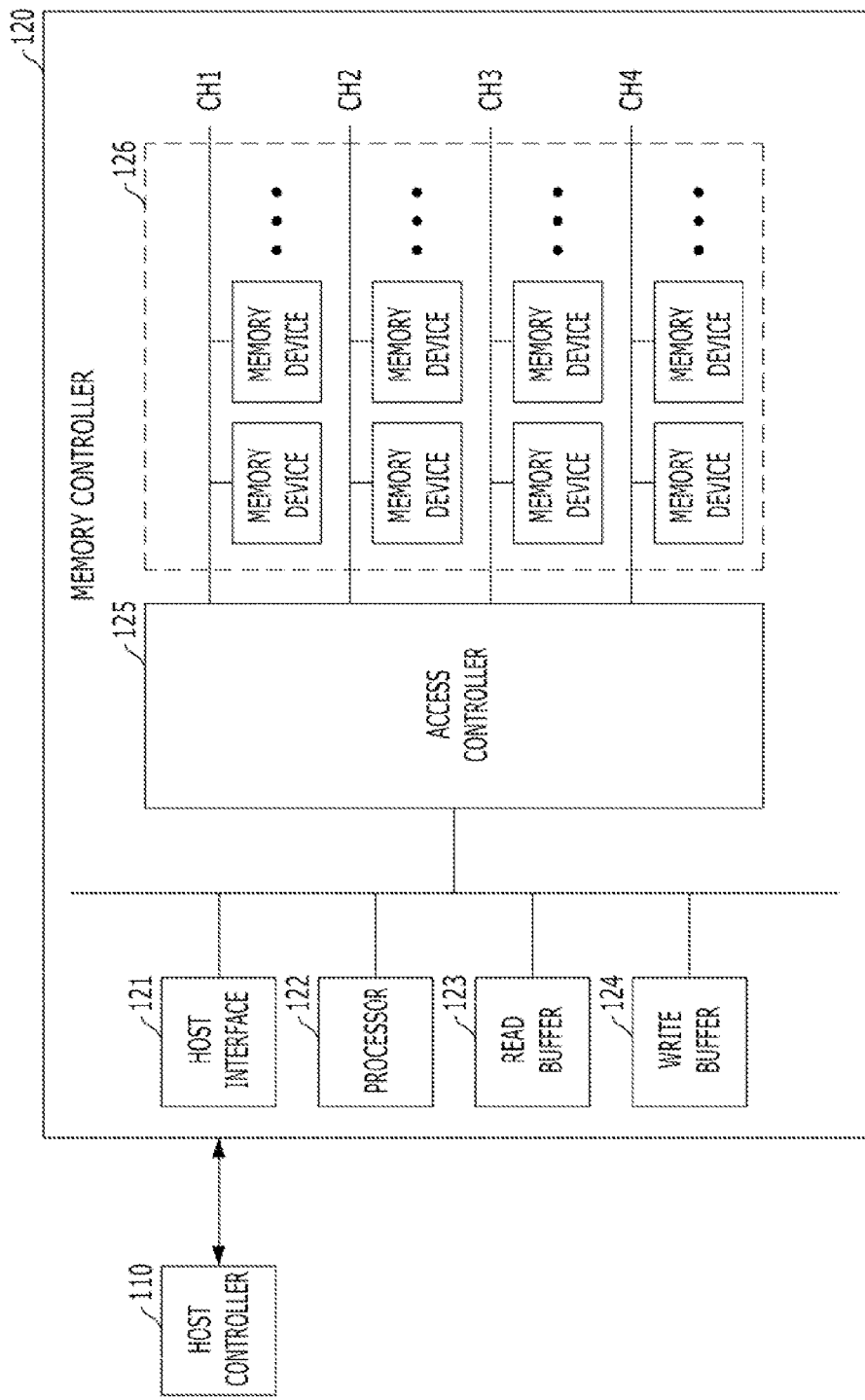
FIG. 1 is a block diagram illustrating a semiconductor memory system in accordance with an embodiment of the present invention.

Exemplary embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the scope of the present invention to those skilled in the art. Throughout the disclosure, reference numerals correspond directly to the like numbered parts in the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically mentioned in a sentence.

Exemplary embodiments of the present invention are described below in connection with a write operation as an example, which should not be construed as limitation of the present invention. Exemplary embodiments may be expanded to other memory access operations.

FIG. 1 is a block diagram illustrating a semiconductor memory system in accordance with an embodiment of the present invention.

Referring to FIG. 1, the semiconductor memory system includes a host controller 110 and a memory controller 120.

The host controller 110 controls the read and write operations of the memory controller 120 and may correspond to a central processing unit (CPU), for example. The memory controller 120 stores data when performing a write operation and outputs stored data when performing a read operation under the control of the host controller 110. The memory controller 120 includes a host interface 121, a processor 122, a read buffer 123, a write buffer 124, an access controller 125, and a plurality of memory devices 126.

The host controller 110 exchanges signals with the memory controller 120 through the host interface 121, and the processor 122 controls the access controller 125. The read buffer 123 receives data stored in the plurality of memory devices 126 and outputs the received data when a read operation is performed, and the write buffer 124 receives external data when a write operation is performed. Furthermore, the access controller 125 controls an access operation on a memory device in which data will be stored among the plurality of memory devices 126 when a write operation is performed and controls an access operation on a memory device in which data to be outputted is stored among the plurality of memory devices 126 when a read operation is performed. Each of the plurality of memory devices 126 stores data when a write operation is performed and outputs stored data when a read operation is performed.

Each of the plurality of memory devices 126 in accordance with an embodiment of the present invention has a multi-plane structure to be described with reference to FIG. 2. The access controller 125 controls each of the multiple planes so that each of the multiple planes is accessed as one unit memory. That is, in the semiconductor memory system in accordance with an embodiment of the present invention, access unit on the plurality of memory devices 126 is a plane.

Figure 2:
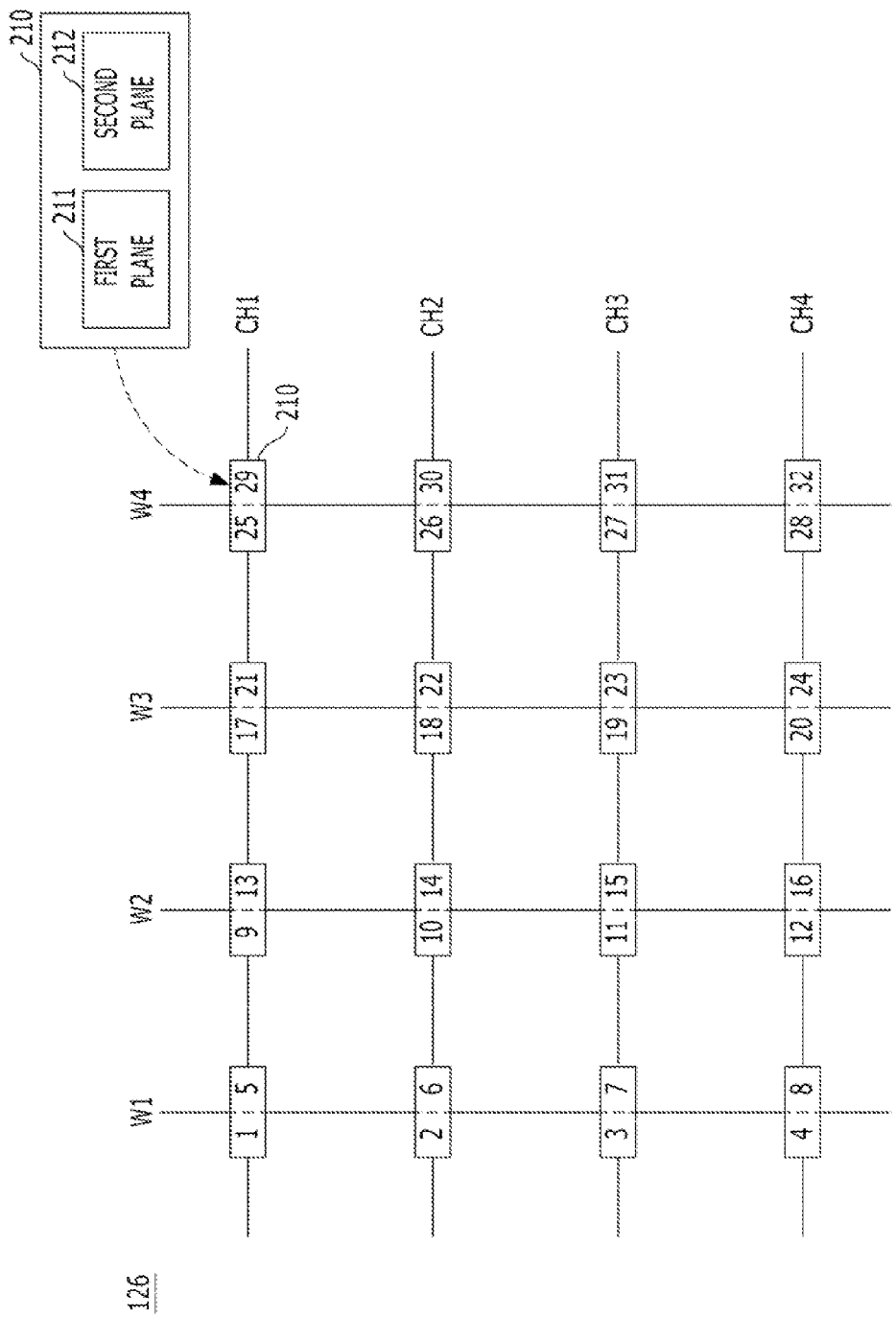
FIG. 2 is a block diagram illustrating a plurality of memory devices shown in FIG. 1.

FIG. 2 is a block diagram of the plurality of memory devices 126 shown in FIG. 1.

Referring to FIG. 2, the arrangement of each of the plurality of memory devices 126 is defined by a plurality of channels and a plurality of ways. For convenience of description, it is assumed that each number of the channels and the ways is 4. That is, the arrangement of 16 memory devices 126 may be defined by a first to a fourth channels CH1, CH2, CH3, and CH4 and a first to a fourth ways W1, W2, W3, and W4. Here, a channel is connected with a plurality of corresponding memory devices as shown in FIG. 1

As described above, the arrangement of the plurality of memory devices 126 is defined by the channels and the ways. That is, the plurality of memory devices 126 is disposed at cross points of channels in one direction and ways in the other direction, which means that the arrangement of each of the plurality of memory devices 126 may be defined by coordinate system, which the channels and ways create.

Meanwhile, each of the plurality of memory devices 126 has multiple planes. One (for example, a memory device 210) of the plurality of memory devices 126 is described below as an example.

The memory device 210 includes first and second planes 211 and 212, that is, multiple planes. Here, a plane means a unit memory in which data is stored. A memory cell array or a page buffer may be the plane. Meanwhile, one memory device may have two or more planes. It is hereinafter assumed that the memory device 210 includes the first and second planes 211 and 212, that is, two planes, for convenience of description. Accordingly, the 16 memory devices 126 include 32 planes, and an access operation on each of the planes is controlled by the access controller 125 (refer to FIG. 1).

The semiconductor memory system in accordance with an embodiment of the present invention accesses the plurality of memory devices 126 in order of priority such as that shown in FIG. 2. The order of priority for the access operation is a channel, a plane, and a way.

In other words, first, all of the first to the fourth channels CH1, CH2, CH3, and CH4 is sequentially accessed with the first plane and the first way, and after that, all of the first to the fourth channels CH1, CH2, CH3, and CH4 is sequentially accessed with the second plane and the first way W1, which is repeated until all of the first to the fourth way W1 to W4 are selected to access all of the plurality of the plane of the memory devices 126. FIG. 2 shows order of access sequence from '1' to '32' with the priority order of the channel, the plane, and the way.

Figure 3:
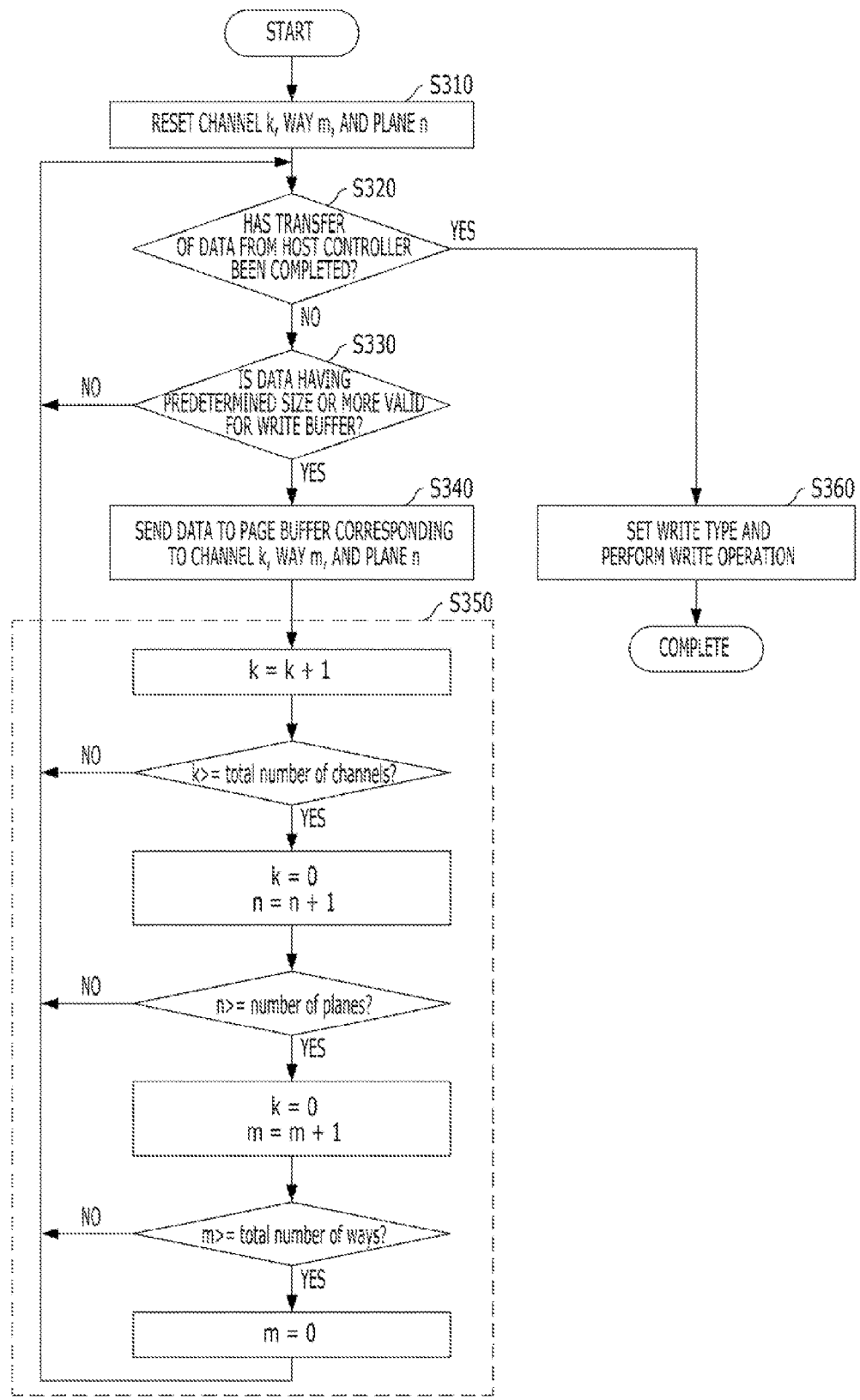
FIG. 3 is a flowchart illustrating an operating method of the semiconductor memory system in accordance with an embodiment of the present invention.

FIG. 3 is a flowchart illustrating an operating method of the semiconductor memory system in accordance with an embodiment of the present invention.

Referring to FIG. 3, the operating method of the semiconductor memory system includes initializing a channel k, a way m, a plane n at step S310, determining whether the transfer of data from the host controller 110 has been completed or not at step S320, determining whether data having a predetermined size or more is valid for the write buffer 124 or not at step S330, transmitting data to a buffer corresponding to the channel k, the way m, and the plane n at step S340, selecting a plane to which the data will be stored at step S350, and setting a write type and performing a write operation at step S360.

First, at the step S310, k, m, and n, that is, parameters corresponding to the respective channel, way, and plane, are initialized. Here, k, m, and n are natural numbers and are assumed to be all initialized to 1, for example. At the step S320, whether the transfer of data from the host controller 110 (refer to FIG. 1) has been completed or not. If, as a result of the determination, it is determined that all the data has been transmitted (that is, Yes), the process proceeds to the step S360. If, as a result of the determination, it is determined that all the data has not been transmitted (that is, No), the process proceeds to the step S330. The step S360 is described in detail later.

At the step S330, whether the size of data to be stored in the write buffer 124 is a predetermined size, for example, one page size or more or less than one page size. If, as a result of the determination, it is determined that the size of the data is one page size or more (that is, Yes), the process proceeds to the step S340. If, as a result of the determination, it is determined that the size of the data is less than one page size (that is, No), the process proceeds to the step S320. If the size of the data stored in the write buffer 124 is one page size or more, an operation of changing a target plane from a current plane (for example, '1' in FIG. 2) to a next plane (for example, '2' in FIG. 2) according to priority of FIG. 2 is performed. The data is transmitted to a write buffer corresponding to the next memory device. Here, the operation of selecting the next memory device corresponds to the step S350, and the operation of transmitting the data corresponds to the step S340. That is, at the step S340, the data is transmitted to a write buffer corresponding to the channel k, the way m, and the plane n determined at the step S350 of previous cycle of the process. For reference, when all of the plurality of memory devices 126 each of which has multi-planes are selected defined by the step S350, the access order is such as shown in FIG. 2, namely '1' to '32'.

At the step S360, a write operation is performed on the data transferred from the write buffer 124. Furthermore, at the step S360, a write type is set when performing the write operation. Here, the write type includes a multi-write type in which a write operation is performed on a plurality of planes at the same time and a cache write type in which a write operation is performed using a cache buffer. To set the write type may be controlled as needed.

A data access operation is described briefly below with reference to FIGS. 2 and 3.

First, as a result of the step S310 where parameters corresponding to the respective channel, way, and plane are initialized, the plane '1' is selected, data is transferred to and stored in a buffer corresponding to the plane '1'. At this time, the data stored in the buffer corresponding to the plane '1' is not yet stored in corresponding plane of the memory device 126. Next, data is sequentially transferred to and stored in buffers corresponding to the respective planes '2', '3', and '4'. Next, when the plane '5' is selected, data is transferred to and stored in a buffer corresponding to the plane '5'. At this time, a multi-write operation may be performed on the plane '1' and the plane '5'. Here, it may be considered that a write type of the data transferred to the plane '1' is determined based on the data transferred to the plane '5'. It reveals that after the access operations are performed on the planes '1' and '5', a write operation is performed on a memory device including the planes '1' and '5'.

Figure 4:
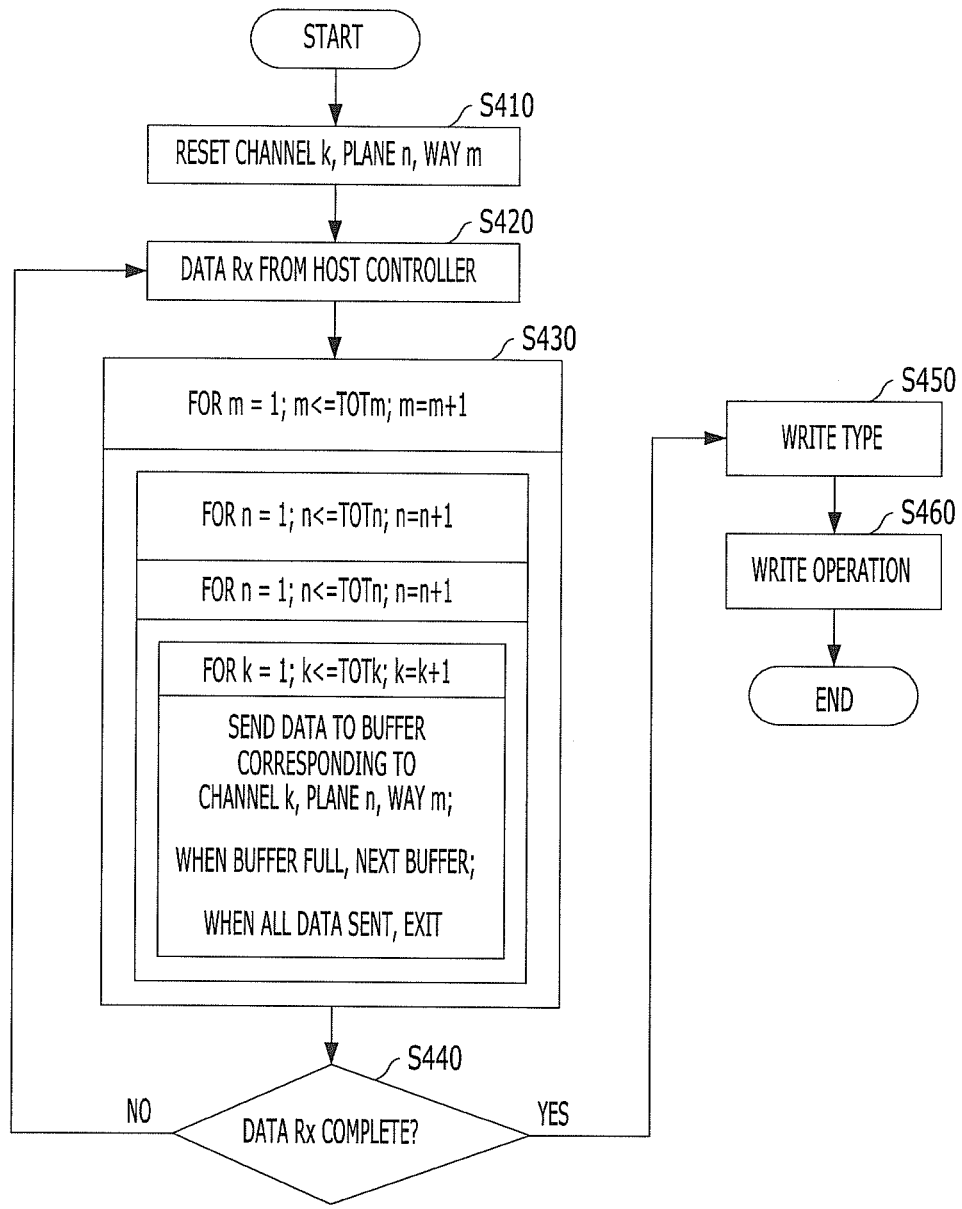
FIG. 4 is a flowchart illustrating an operating method of the semiconductor memory system in accordance with another embodiment of the present invention.

FIG. 4 is a flowchart illustrating an operating method of the semiconductor memory controller in accordance with another embodiment of the present invention.

Referring to FIG. 4, the access controller 125 resets parameters corresponding to the respective channel, way, and plane at step S410. The access controller 125 receives data from the host controller 110 at step S420. The received data is temporarily stored in buffers of the write buffer 124 respectively corresponding to the plural planes of the memory devices 126, and eventually stored in the corresponding planes of the memory device 126 as a result of the step S460 which will be described later.

At the step S430, the received data is sent to buffers respectively corresponding to planes of the memory devices 126 in order of access priority, namely a channel, a plane, and a way. As shown in the step S430 where numbers of channels, planes, and ways are TOTk, TOTn, and TOTm, respectively, and the received data is sent in accordance with the order of access priority to buffers corresponding to planes defined by number k, n, and m indicating the channel, the plane, and the way, respectively, when a buffer of the write buffer 124 is full with the received data, the rest of the received data is stored in another buffer of the write buffer 124 that has next order of access priority, for example as shown in FIG. 2, in the order of access sequence from '1' to '32' with the priority order of the channel, the plane, and the way. When all of the received data is sent to at least one buffer of the write buffer 124, memory controller 120 exits the step S430 and proceeds to the step S440.

At the step S440, the access controller 125 checks whether or not the data transmission from the host controller 110 is completed. If the data transmission is not completed, the access controller 125 returns back to the step S420 to receive data from the host controller 110. The steps S420 to S440 are repeated until the data transmission from the host controller 110 is completed. When it is checked at the step S440 that the data transmission from the host controller 110 is completed, the access controller 125 at the step S450 sets one of the write types, namely the multi-write type and the cache write type. At the step S460, the access controller 125 performs write operation with the set write type to store data, which is sent to the buffers at the step S430, in corresponding planes of the memory devices 126 determined by the parameters of channel k, plane n, and way m.

The semiconductor memory system in accordance with an embodiment of the present invention determines priority in order of a channel, a plane, and a way in accessing the planes of a plurality of semiconductor memory devices. Furthermore, by way of the plane selection operation, a data access operation may be performed more rapidly and overall write operation performance may be improved.

Furthermore, in the aforementioned embodiments, a write operation has been illustrated as an example, but the present invention may be applied to other operations, such as a read operation. For example, in a read operation, like in the write operation, priority may be determined in order of a channel a plane, and a way. However, in the read operation, access to the planes of the memory devices 126 is performed first, and then data read from the plane as a result of the access is sent to the read buffer 123 and then to the host controller 110.

As a result, there are advantages in that an access operation may be rapidly performed on a plurality of memory devices, and thus overall circuit operating speed may be increased.

While the present invention has been described with respect to the specific embodiments, it will be apparent to those skilled in the art that various changes and modifications may be made without departing from the spirit and scope of the invention as defined in the following claims.

What is claimed is:

1. A semiconductor memory system, comprising:
a plurality of memory devices arranged by a plurality of channels and a plurality of ways, each configured to include multiple planes; and
an access controller configured to access each of the multiple planes corresponding to each of the plurality of memory devices as a unit memory based on the channels and the ways to perform a read operation and a write operation of the multiple planes included in each of the memory device.

2. The semiconductor memory system of claim 1, further comprising:
a host controller configured to control the read operation and the write operation on the plurality of memory devices;
a read buffer configured to receive data from the plurality of memory devices when performing the read operation; and
a write buffer configured to receive external data when performing the write operation.

3. An operating method of a semiconductor memory system, comprising:
selecting one of multiple planes included in a plurality of memory devices arranged by a plurality of channels and a plurality of ways; and
performing an access operation on the selected plane,
wherein the selecting of the one plane is determined according to priority of the plurality of channels, the multiple planes, and the plurality of ways,
wherein the performing of the access operation on the selected plane includes a read operation and a write operation of the selected plane.

4. The operating method of claim 3, wherein each of the plurality of channels comprises a common transmission line.

5. The operating method of claim 3, wherein determining the priority comprises giving first priority to the plurality of channels as, giving second priority to the multiple planes, and giving third priority to the plurality of ways.

6. The operating method of claim 3, wherein the access operation is write operation.

7. The operating method of claim 6, further comprising:
determining a size of data received from a host before the selecting one of multiple planes; and
transferring the data through the write operation on the selected plane after the selecting one of multiple planes.

8. The operating method of claim 7, wherein the write operation is performed after data to be stored in a corresponding memory device of the plurality of memory devices is transferred.

9. The operating method of claim 7, wherein a write type of the plurality of memory devices is determined according to data transferred to a last plane of multiple planes included in a corresponding memory device.

10. An operating method of a plurality of memory devices, comprising:
accessing a plurality planes in the plurality of memory devices arranged by a plurality of channels and a plurality of ways, with an access priority, wherein
each of the plurality of memory devices has at least two planes,
the plane is a unit of access to the plurality of memory devices, and
each of the planes has the access priority,
wherein the access priority is determined based on priority of the plurality of channels, the planes, and the plurality of ways, and the performing of the access operation on the planes includes a read operation and a write operation of the planes.

11. The method of claim 10, wherein each of the planes is identified with a channel and a way, and each of the planes in a memory device is distinguishable from one another.

12. The method of claim 11, wherein the access priority is defined in order of the channel, the plane, and the way.

13. The method of claim 12, wherein the channel is a transmission line connected with at least one of the plurality of memory devices.

14. The method of claim 11, wherein the performing of access receives data from outside, sends the received data to temporary storage units respectively corresponding to the planes according to the access priority, and performs access operation.

15. The method of claim 14, wherein the sending of the received data sends the received data to the temporary storage units until all of the received data is sent to the temporary storage units.

16. The method of claim 14, wherein when one of the temporary storage units is full with the received data, the sending of the received data sends the rest of the received data to another one of the temporary storage units with the access priority next to the one that is full with the received data.

17. The system of claim 14, wherein the performing of access operation performs access operation with one of preset access types.

18. The system of claim 17, wherein the preset access types include a multi-access operation where an access operation is performed on the planes at substantially the same time, and a cache access type where the access operation is performed using a cache buffer.

19. The method of claim 11, wherein the performing of access performs access operation according to the access priority, sends a data as a result of the access operation to temporary storage units respectively corresponding to the planes, and sends the data to outside.

20. The method of claim 19, wherein the sending of the data to temporary storage units sends the data to the temporary storage units until all of the data is sent to the temporary storage units.

* * * * *